(12) United States Patent
Crue, Jr. et al.

(10) Patent No.: US 6,304,414 B1
(45) Date of Patent: Oct. 16, 2001

(54) THIN FILM MAGNETIC WRITE HEAD HAVING AN ULTRA-LOW STACK HEIGHT

(75) Inventors: Billy W. Crue, Jr., San Jose; Renuka Apparao, Fremont; Zhupei Shi, San Jose; Sean Yao, Milpitas, all of CA (US)

(73) Assignee: Read-Rite Corporation, Fremont, CA (US)

( * ) Notice: Subject to any disclaimer, the term of this patent is extended or adjusted under 35 U.S.C. 154(b) by 0 days.

(21) Appl. No.: 09/357,580

(22) Filed: Jul. 20, 1999

(51) Int. Cl.[7] .................................................. G11B 5/31
(52) U.S. Cl. ................................. 360/126; 360/123
(58) Field of Search ................................. 360/119, 121, 360/123, 126

(56) References Cited

U.S. PATENT DOCUMENTS

| | | | |
|---|---|---|---|
| 4,190,872 | 2/1980 | Jones, Jr. et al. | 360/125 |
| 4,241,367 | 12/1980 | Nomura et al. | 360/127 |
| 4,318,148 | 3/1982 | Kaminaka et al. | 360/127 |
| 4,416,056 | 11/1983 | Takahashi | 29/603 |
| 4,727,643 | 3/1988 | Schewe et al. | 29/603 |
| 4,943,882 | 7/1990 | Wada et al. | 360/126 |
| 5,113,300 | 5/1992 | Ikeda et al. | 360/126 |
| 5,198,949 | 3/1993 | Narisawa | 360/126 |
| 5,241,439 | 8/1993 | Michalek et al. | 360/113 |
| 5,331,495 | 7/1994 | Yoshida et al. | 360/126 |
| 5,710,683 | * 1/1998 | Sundaram | 360/126 |
| 5,805,391 | * 9/1998 | Chang et al. | 360/126 |
| 5,872,693 | * 2/1999 | Yoda et al. | 360/126 |
| 6,111,724 | * 1/2000 | Santini | 360/126 |
| 6,151,194 | * 11/2000 | Steinbrecher | 360/126 |
| 6,198,597 | * 3/2001 | Tateyama et al. | 360/126 |

* cited by examiner

Primary Examiner—Brian E. Miller
(74) Attorney, Agent, or Firm—Carr & Ferrell

(57) ABSTRACT

A magnetoresistive write element having a greatly reduced stack height allowing construction of a smaller track width and tighter track width tolerances. The reduced stack height also produces improved magnetic flux flow properties in the write element leading to an improved magnetic fringing field in the write gap region The magnetoresistive write head includes an electrically conductive planar coil having a portion thereof extending between first and second poles. The first and second poles join one another to form a magnetic yoke which is closed at one end and open at the other. An insulation layer separates the coil from the first pole. Another layer of insulating material is formed into the coil, interspersed between the winds and having an upper surface which is flush with the upper surface of the coil. A thin layer of write gap material insulates the coil from the second pole. Since there is only a thin layer of write gap material between the coil and the second pole, rather than a thicker insulation layer, the topography of the second pole can be reduced. This lowers the stack height which allows the second pole to be constructed to define a smaller write gap with tighter tolerances.

18 Claims, 13 Drawing Sheets

THIN FILM MAGNETIC WRITE HEAD HAVING AN ULTRA-LOW STACK HEIGHT

BACKGROUND OF THE INVENTION

This invention relates generally to magnetic disk data storage systems, and more particularly to magnetic write transducers and methods of making same.

Magnetic disk drives are used to store and retrieve data for digital electronic apparatuses such as computers. In FIGS. 1A and 1B, a magnetic disk data storage system 10 of the prior art includes a sealed enclosure 12, a disk drive motor 14, a magnetic disk 16, supported for rotation by a drive spindle S1 of motor 14, an actuator 18 and an arm 20 attached to an actuator spindle S2 of actuator 18. A suspension 22 is coupled at one end to the arm 20, and at its other end to a read/write head or transducer 24. The transducer 24 (which will be described in greater detail with reference to FIG. 2A) typically includes an inductive write element with a sensor read element As the motor 14 rotates the magnetic disk 16, as indicated by the arrow R, an air bearing is formed under the transducer 24 causing it to lift slightly off of the surface of the magnetic disk 16, or, as its is termed in the art, to "fly" above the magnetic disk 16. Alternatively, some transducers, known as contact heads," ride on the disk surface. Various magnetic "tracks" of information can be written to and/or read from the magnetic disk 16 as the actuator 18 causes the transducer 24 to pivot in a short arc as indicated by the arrows P. The design and manufacture of magnetic disk data storage systems is well known to those skilled in the art.

FIG. 2A depicts a magnetic read/write head 24 including a substrate 25 above which a read element 26 and a write element 28 are disposed. Edges of the read element 26 and write element 28 also define an air bearing surface ABS, in a plane 29, which can be aligned to face the surface of the magnetic disk 16 (see FIGS. 1A and 1B). The read element 26 includes a first shield 30, an intermediate layer 32, which functions as a second shield, and a read sensor 34 that is located within a dielectric medium 35 between the first shield 30 and the second shield 32. The most common type of read sensor 34 used in the read/write head 24 is the magnetoresistive (AMR or GMR) sensor, which is used to detect magnetic field signals from a magnetic medium through changing resistance in the read sensor.

The write element 28 is typically an inductive write element which includes the intermediate layer, which functions as a first pole 32, and a second pole 38 disposed above the first pole 32. The first pole 32 and the second pole 38 are attached to each other by a backgap portion 40, with these three elements collectively forming a yoke 41. The combination of a first pole tip portion 43 and a second pole tip portion 45 near the ABS are sometimes referred to as the yoke tip portion 46. A write gap 36 is formed between the first and second poles 32 and 38 in the yoke tip portion 46. The write gap 36 is filled with a non-magnetic, electrically insulating material that forms a write gap material layer 37. This non-magnetic material can be either integral with (as is shown here) or separate from a first insulation layer 47 that lies below the second pole 38 and extends from the yoke tip portion 46 to the backgap portion 40.

Also included in write element 28 is a conductive coil 48, formed of multiple winds 49 which each have a wind height Hw. The coil 48 can be characterized by a dimension sometimes referred to as the wind pitch P, which is the distance from one coil wind front edge to the next coil wind front edge, as shown in FIG. 2A As is shown, the wind pitch P is defined by the sum of the wind thickness Tw and the separation between adjacent winds Sw. The conductive coil 48 is positioned within a coil insulation layer 50 that lies above the first insulation layer 47. The first insulation layer 47 thereby electrically insulates the winds 49 from each other and from the second pole 38.

The configuration of the conductive coil 48 can be better understood with reference to a plan view of the read/write head 24 shown in FIG. 2B taken along line 2B—2B of FIG. 2A Because the conductive coil extends beyond the first and second poles, insulation may be needed beneath, as well as above, the conductive coil to electrically insulate the conductive coil from other structures. For example, as shown in FIG. 2C, a view taken along line 2C—2C of FIG. 2A, a buildup insulation layer 52 can be formed adjacent the first pole, and under the conductive coil layer 48. As will be appreciated by those skilled in the art, these elements operate to magnetically write data on a magnetic medium such as a magnetic disk 16 (see FIGS. 1A and 1B).

More specifically, an inductive write head such as that shown in FIGS. 2A–2C operates by passing a writing current through the conductive coil layer 48. Because of the magnetic properties of the yoke 41, a magnetic flux is induced in the first and second poles 32 and 38 by write currents passed through the coil layer 48. The write gap 36 allows the magnetic flux to fringe out from the yoke 41 (thus forming a fringing gap field) and to cross a magnetic recording medium that is placed near the ABS. A critical parameter of a magnetic write element is a trackwidth of the write element, which defines track density. For example, a narrower trackwidth can result in a higher magnetic recording density. The trackwidth is defined by the geometries in the yoke tip portion 46 (see FIG. 2A) at the ABS. These geometries can be better understood with reference to FIG. 2C. As can be seen from this view, the first and second poles 32 and 38 can have different widths W1 and W2 respectively in the yoke tip portion 46 (see FIG. 2A). In the shown configuration, the trackwidth of the write element 28 is defined by the width W2 of the second pole 38. The gap field of the write element can be affected by the throat height TH, which is measured from the ABS to the zero throat ZT, as shown in FIG. 2A. Thus, accurate definition of the trackwidth and throat height is critical during the fabrication of the write element.

However, the control of trackwidth, throat height, and coil pitch can be limited by typical fabrication processes, an example of which is shown in the process diagram of FIG. 3. The method 54 includes an operation 56 of providing a first pole with first and second edges. This operation can include, for example, forming a plating dam, plating and then removing the dam. In an operation 58, a write gap material layer is formed over the first pole. In particular, the write gap material layer is formed over an upper surface and the first and second edges of the first pole. Also, in operation 58, a via is formed through the write gap material layer to the first pole in the backgap portion 40 (see FIG. 2A). In the instance herein described, the write gap material layer extends above the first pole in the area between the yoke tip portion and the backgap portion, although in other cases the write gap material layer may not be above this area A buildup insulation layer is typically formed by depositing (e.g., spinning) and patterning photoresistive material and then hard balking the remaining photoresistive material. Such processes often result in the height of the buildup insulation layer being non-uniform.

In an operation 62 the first coil layer is formed above the write gap material layer and the buildup insulation layer.

This can include first depositing a seed layer above the first pole. Typically, photoresistive material can then be deposited and patterned. With the patterned photoresistive material, conductive material can be plated. With removal of the photoresistive material, the remaining conductive material thereby forms the first coil layer.

Unfortunately, when there is a difference in height between the write gap material layer and the buildup insulation layer, the patterning of the photoresistive material for the first coil layer can be complicated. In particular, it can be difficult to pattern the various heights to have consistent geometries. More specifically, winds of the resulting first coil layer can be wider at lower levels than at higher levels, such as between the first and second poles. Thus, for a given pitch, such greater width at the lower levels can result in smaller distances between winds. This can, in turn, result in electrical conduction between winds which can be detrimental to write performance. To avoid such electrical shorting, the minimum wind pitch can be set to a desired value that will result in adequate yield of non-shorting conductive coil layers. Because the coil winds are more narrow between the first and second poles, the resulting pitch there is typically greater than, and limited by this minimum For example, typical wind pitches between the first and second poles may be limited to no less than about 3 microns. For a given number of winds and wind thickness, this in turn limits the minimum yoke length, and thereby limits the data transfer rate and data density as described above. For example, a pitch of about 3 microns may be adequate for recording densities on the order of about 2 Gb/sq.in., however, these typical pitches can be inadequate for larger recording densities, such as about 10 Gb/sq.in.

In operation 64, the method 54 further includes forming a coil insulation layer above the first coil layer that was formed in operation 62. In an operation 66 a second pole is formed above the coil insulation layer of operation 64.

Still another parameter of the write element performance is the stack height SH, the distance between the top surface of the first pole 32 and the top of the second pole 38, as shown in FIG. 2A. Of course this height is affected by the thickness of the first insulation layer 47, the thickness of the coil layer 48 and any other coil layers that might be included, and the height of the coil insulation layer 50 and any other coil insulation layers that might be included. The stack height can be an indicator of the apex angle α, which partially characterizes the topology over which the second pole must be formed near the yoke tip portion. Typically, the reliability of the write element decreases as the apex angle increases. This is due, at least in part, to the corresponding increased difficulty, particularly in the yoke tip portion 46, of forming the second pole 38 over the higher topography of the stack. For example, the definition of the second pole width W2, shown in FIG. 2C, including photoresist deposition and etching, can be decreasingly reliable and precise with increasing topography. When demand for higher density writing capabilities drives yoke tip portions to have smaller widths W, this aspect of fabrication becomes increasingly problematic.

Greater trackwidth control can be attempted using other processes such as focussed ion beam (FIB) milling, however such processes can be expensive. To support higher data transfer rate applications, the second pole can otherwise be formed by lamination, which can be more time consuming than without lamination. Alternatively, the trackwidth can be defined by the first pole width W1. However, such processes can also be expensive, complex, and result in lower production yields.

Also, with higher topography, when the second pole is formed, for example by sputtering or plating, the material properties of the second pole in the sloped region, adjacent the second pole tip region 45, can be undesirable. Thus, this decreased reliability results in undesirable lower production yield.

As will be appreciated from the above, the performance of a write head is limited by manufacturing capabilities which are controlled by parameters such as the stack height. In order to increase data recording density, it is necessary to design a write head with a reduced track width which requires reducing the stack height. Therefore there remains a need for a write element having such a reduced stack height, and correspondingly small apex angle and trackwidth. Such a write element will be necessary to deliver the high data recording density required by state of the art computer systems.

SUMMARY OF THE INVENTION

The present invention provides a write head having a reduced stack height, allowing the write element to be constructed with a correspondingly reduced track width. The write head of the present invention is embodied in a write head having a magnetic yoke formed of first and second poles and having a closed end defining a back gap portion and an open end defining a write gap portion. A coil, having a plurality of winds, passes through the yoke and is electrically isolated therefrom. A first insulation layer is formed between the coil and the first pole of the yoke, separating the coil therefrom. A second insulation layer fills in the space between the winds insulating them from one another. This second insulation layer has an upper surface which is flush with an upper surface of the coil. A thin layer of non-magnetic, electrically insulating write gap material separates the coil from the second pole.

More particularly, the write head is incorporated into a combination read write head which is built upon a ceramic substrate. The read element includes a first shield formed upon the substrate and a second shield formed above the first shield and spaced a distance therefrom. The first and second shields each have a read end adjacent the write gap portion of the write element, and an end opposite the read end. The second shield has a flat upper surface. A first insulation layer fills the space between the shields and extends beyond the edges of the shields to extend from the substrate to the upper surface of the second pole, terminating at the read end of the shields. A read sensor is embedded within the first insulation layer, between the shields toward the read ends of the shields. The shields can be constructed of a magnetic material such as $Ni_{80}Fe_{20}$, and the insulating layer can be $Al_2O_3$.

The second shield of the read element acts as a part of the first pole of the write element. This first pole also includes a write gap pedestal which extends from the upper surface of the shield at the write gap portion and has a flat upper surface. The first pole further includes a back gap pedestal extending from the upper surface of the shield and having a flat upper surface which is coplanar with the flat upper surface of the write gap pedestal.

A second layer of non-magnetic, electrically insulating material covers the shield of the first pole and has a flat upper surface which is coplanar with the flat upper surfaces of the write gap and back gap pedestals. The second insulation layer extends beyond the edges of the first shield to cover the remainder of the head. A chemical mechanical polishing process generates the smooth flat surface across the second insulation layer and across the tops of the pedestals. The second insulation layer can be constructed of any suitable non-magnetic, electrically insulating material such as alumina ($Al_2O_3$).

The coil sits atop the second insulation layer such that a portion of the coil passes over the first shield between the back gap and write gap pedestals. The coil terminates in inner and outer contacts which are located outside of the yoke. The coil can be constructed of any suitable electrically conducting material such as copper Cu.

A third layer of insulating material is formed over the coil and over the second insulation layer. The third insulation layer fills the space between the winds of the coil and extends beyond the inner and outer edges of the coil to terminate in gently tapered edges. The third insulation layer is formed so as not to cover the pedestals and is formed to leave vias at the coil contacts. This third insulation layer is formed flush with the top of the coil, thereby exposing the upper surface of the coil.

A thin layer of write gap material is formed over the coil and over the third insulation layer. The write gap material insulates the upper surface of the coil from the second pole and is formed so as not to cover the back gap pedestal. The write gap material is also formed with vias to provide access to the coil contacts outside of the yoke.

The second pole is formed over the write gap material and is formed to connect with the back gap pedestal of the first pole to thereby form the yoke. The second pole takes on the tapered shape of the third insulation layer in the region of write gap, thereby defining an apex angle. By separating the coil from the second pole by only a thin layer of write gap material the stack height of the head is reduced by 3 to 4 microns, which greatly improves the ability to construct the head with a required narrow track width as discussed above in the Background of the Invention. Furthermore, sinking the second insulation layer between the pedestals further lowers the stack height. These and other advantages of the present invention will become apparent to those skilled in the art upon a reading of the following descriptions of the invention and a study of the several Figures of the drawings.

BRIEF DESCRIPTION OF THE DRAWINGS

The present invention will be readily understood by the following detailed description in conjunction with the accompanying drawings, with like reference numerals designating like elements.

DETAILED DESCRIPTION OF THE PREFERRED EMBODIMENTS

FIGS. 1A, 1B, 2A–C and 3 were discussed with reference to the prior art.

Figure 1A:
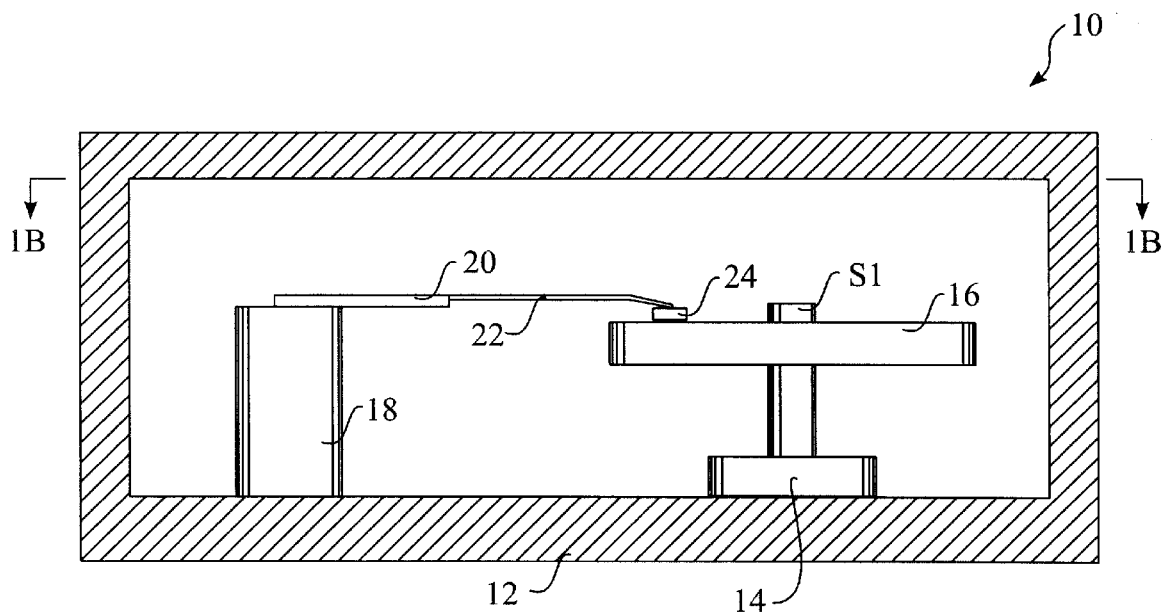
FIG. 1A is a partial cross-sectional front elevation view of a magnetic data storage system.
Figure 1B:
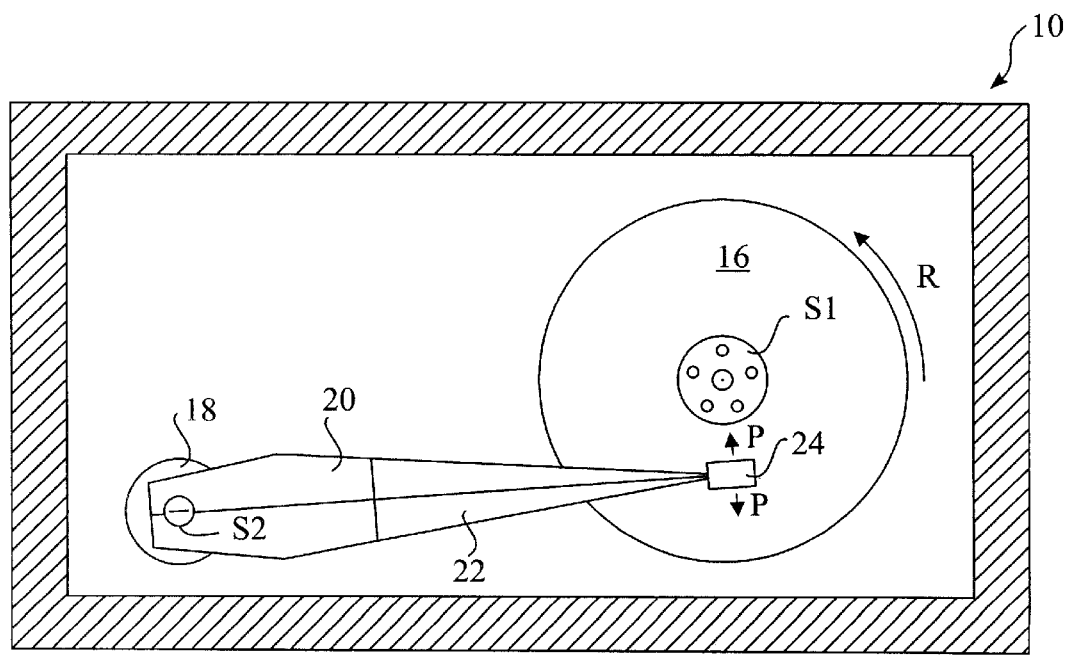
FIG. 1B is a top plan view taken along line 1B—1B of FIG. 1A.
Figure 2A:
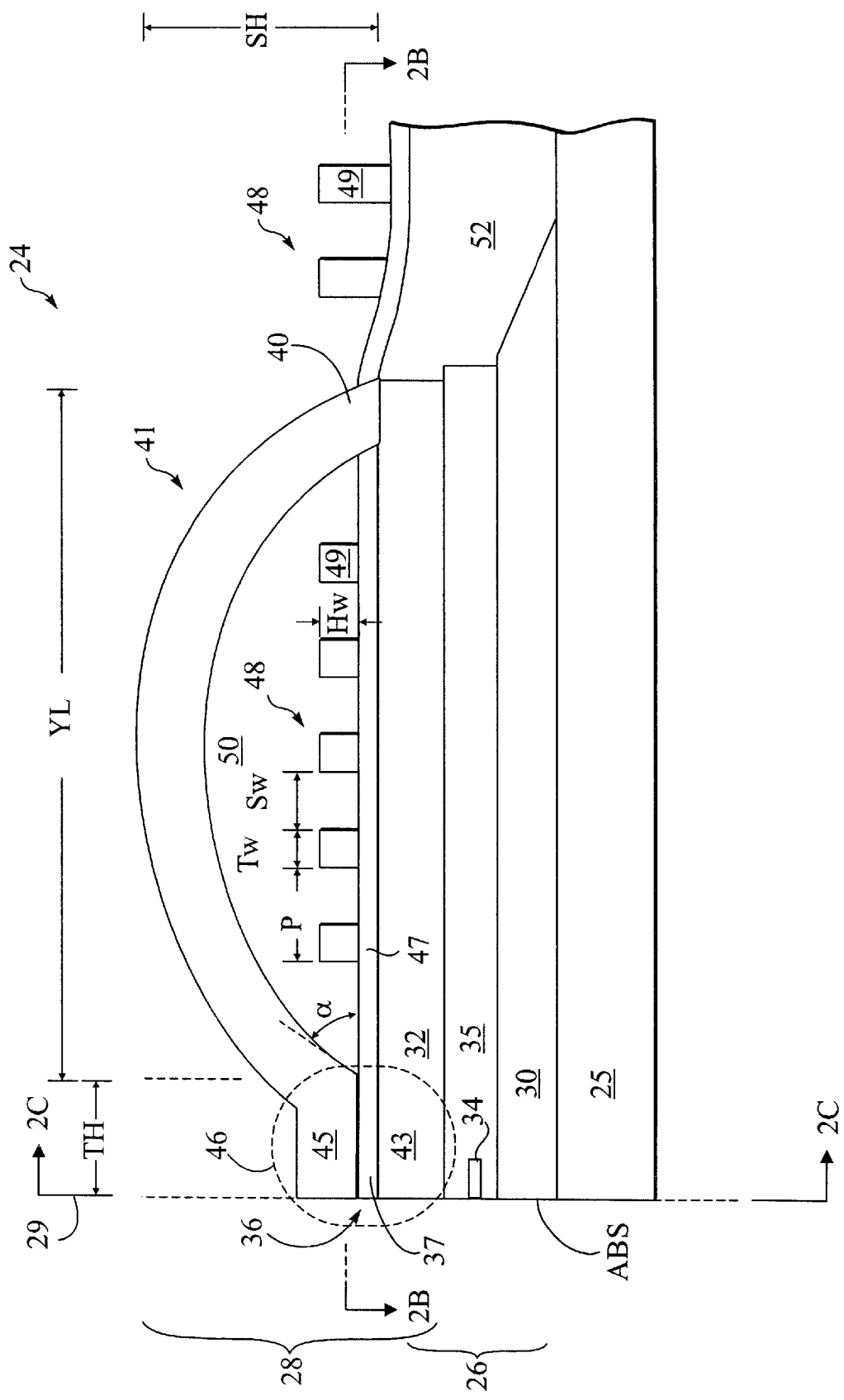
FIG. 2A is a cross-sectional view of a prior art read/write head of the magnetic disk drive assembly of FIGS. 1A and 1B.
Figure 2B:
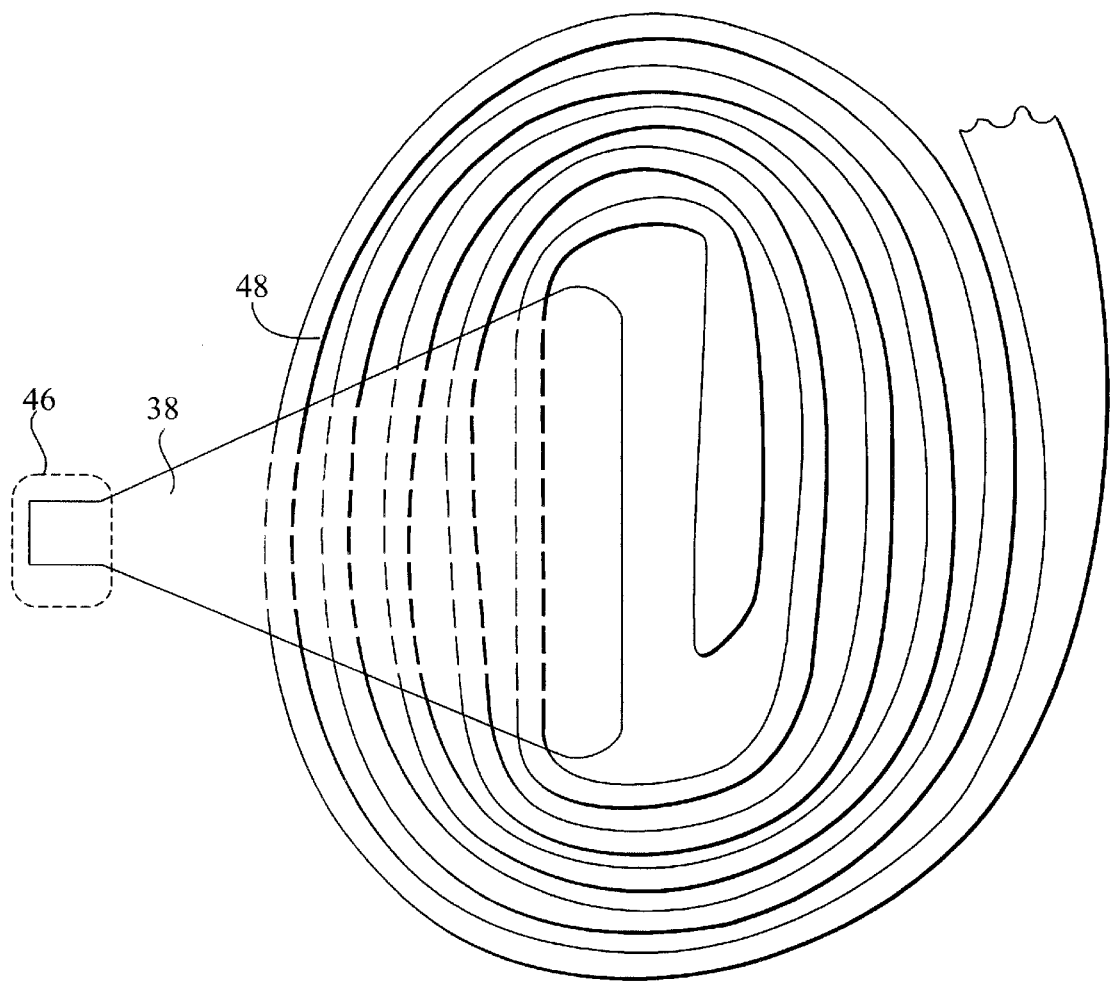
FIG. 2B is a plan view taken along line 2B—2B of FIG. 2A.
Figure 2C:
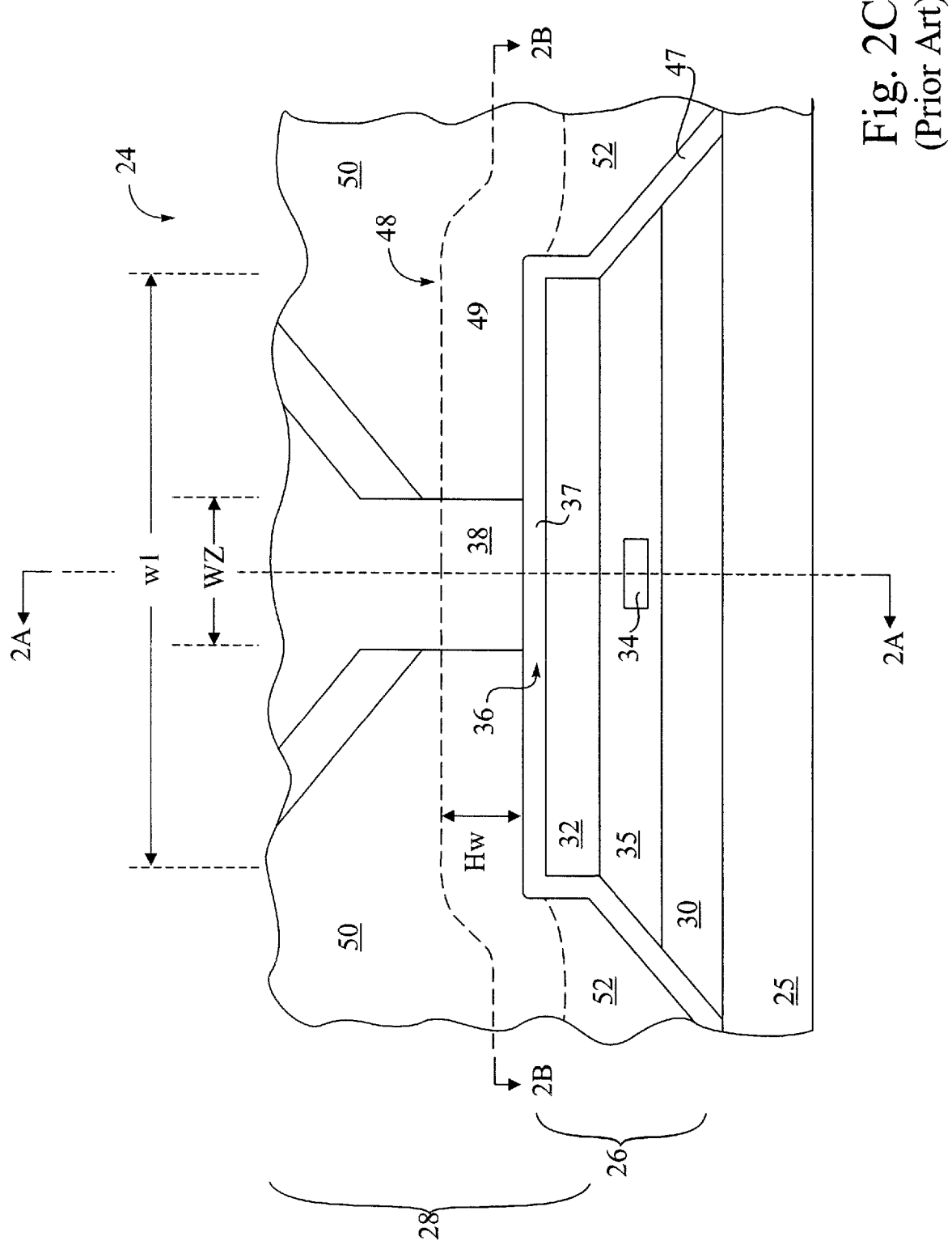
FIG. 2C is an ABS view taken along line 2C—2C of FIG. 2A.
Figure 3:
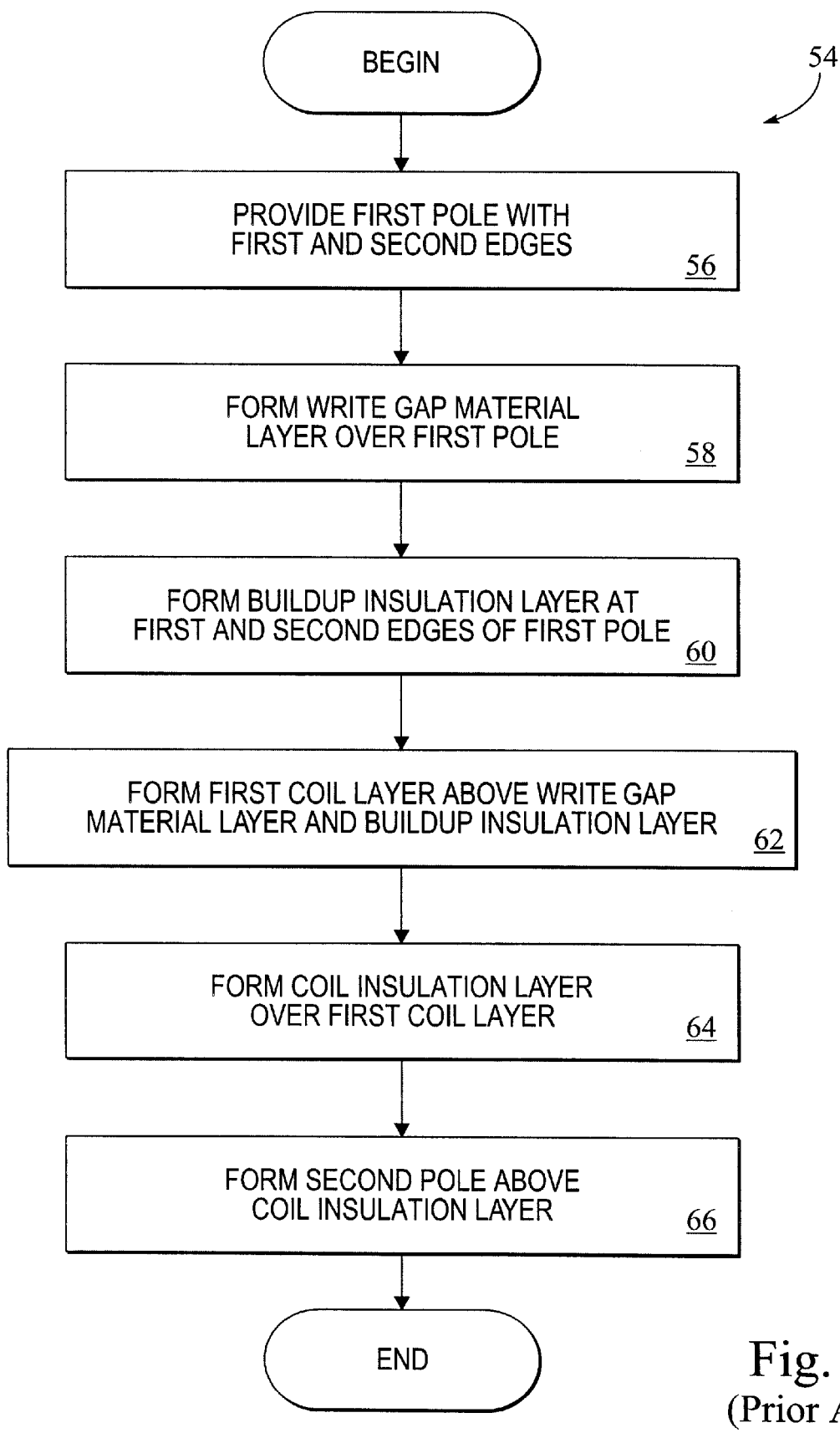
FIG. 3 is a process diagram of a method for forming a write element of the prior art.
Figure 4:
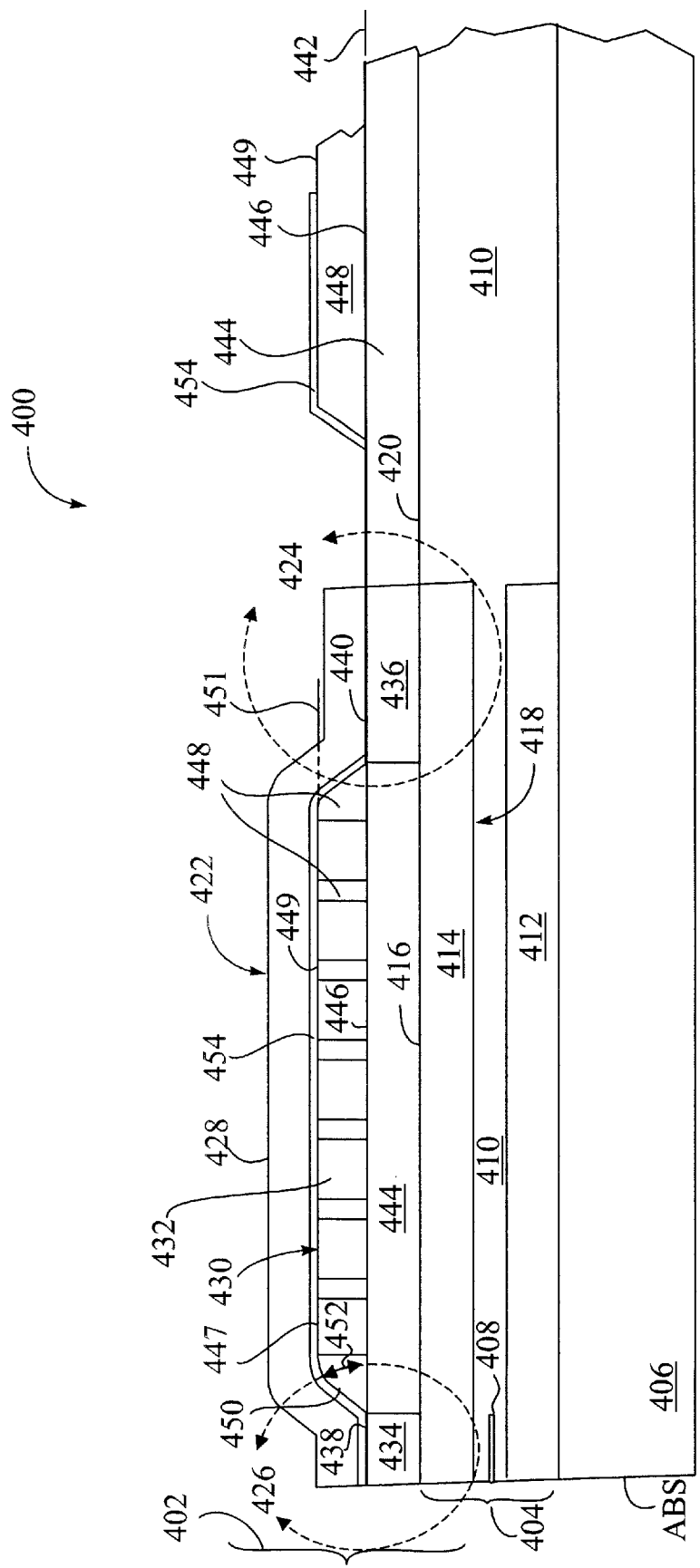
FIG. 4 is a cross sectional view of a read/write head of the present invention.

With reference to FIG. 4, the present invention is embodied in a read/write head 400 having a write portion 402 and a read portion 404 supported upon a substrate 406. The head defines an air bearing surface (ABS) at its end. The read portion includes a read element 408 embedded within a dielectric material 410 between first and second shields 412 and 414 respectively. The second shield has a planar top surface 416 and also serves as a portion of a first pole 418 of the write element 402. The dielectric material 410 extends beyond the edges of the shields 412 and 414 to rise to a planar top surface 420 which is flush with the top surface 416 of the shield 412.

The write portion 402 includes a magnetic yoke, generally designated 422, having an end defining a back gap portion 424 and an opposite end defining a write gap portion 426. The yoke 422 includes the first pole 418 and a second pole 428 both of which are joined together at the back gap portion 424. The write element further includes an electrically conducting coil 430 having a plurality of winds 432. The coil 430 is formed so that a portion of each wind 432 passes through the interior of the yoke 422 between the two poles 418 and 428. The coil 430 is electrically insulated from the yoke 422.

With continued reference to FIG. 4, a write gap pedestal 434 extends from the upper surface 416 of the second shield 414. The write gap pedestal has an edge which is flush with the ABS, and has a smooth planar upper surface 438. Similarly, the back gap pedestal 436 has a smooth planar upper surface 440. The upper surfaces 438 and 440 of the write gap and back gap pedestals 434 and 436 respectively, define a plane 442. The pedestals 434 and 436, together with the second shield 414, form the first pole 418.

A second layer of non-magnetic dielectric material 444 covers the second shield 414 and extends laterally beyond the yoke 422. The second layer 444 of dielectric material has a smooth planar upper surface 446 which is coplanar with the upper plane 442 and is flush with the upper surfaces 438 and 440 of the pedestals 434 and 436. While the second dielectric layer could be constructed of any suitable non-magnetic, dielectric material, it is preferably formed of Alumina ($Al_2O_3$).

The coil 430 sits upon the second dielectric layer 444, with a portion of the coil passing between the write gap portion 426 and back gap portion 424. As with the head 24 of the background ark, the coil 430 extends beyond the yoke 422 and behind the back gap portion. Such arrangement can be understood more clearly with reference to FIG. 2B which shows a plan view of a yoke 38 and coil 48 of the background art. Similar to the coil of 48 of the prior art, the coil 430 of the present invention has a pair of contacts (not shown) which are located outside of the yoke 422. With reference again to FIG. 4, the coil 430 has a smooth planar upper surface 447 which defines a second plane 451. While the coil 430 could be constructed of any suitable electrically conductive material, it is preferably constructed of copper (Cu).

A third dielectric insulation layer 448 is formed above the second dielectric layer 444. The third insulation layer 448 has a smooth planar upper surface which is coplanar with the upper surface 447 of the coil 430 across the plane 451, and is formed so as not to cover the upper surface 440 of the back gap pedestal 436. The insulation layer 448 is also formed to provide vias at the location of the contacts of the coil 430. The third insulation layer 448 fills the space between the winds 432 of the coil 430. It also fills the space between the coil 430 and the write gap portion 426 and between the coil 430 and the back gap portion 424 of the yoke 422. In addition, the third insulation layer 448 has a tapered edge 450 which defines an angle 452. While the third insulation layer could be constructed of any suitable non-magnetic, electrically insulating material, it is preferably constructed of cured photoresist.

A thin layer of write gap material 454 is formed over coil 430 and the third insulation layer 448. Like the third insulation layer 448, the write gap material is formed so as not to cover the upper surface 440 of the back gap pedestal and is formed to provide vias at the location of the contacts of the coil 430. However, the write gap material layer does cover the write gap pedestal. While the write gap material could be formed at various thicknesses, it preferably has a nominal thickness of less than 0.5 microns and more preferably has a thickness between 0.1 and 0.3 microns. Also, while the write gap material could consist of any suitable non-magnetic, dielectric material, it is preferably formed of Alumina ($Al_2O_3$).

To complete the yoke, the second pole 428 is formed over the write gap material 454 and over the first pole 418. The second pole 428 is constructed of a magnetic material and is plated onto the write gap material layer 454 such that the second pole 428 covers the upper surface 440 of the back gap pedestal 436 in the back gap portion 424 of the yoke 422. While the second pole could be formed of any suitable magnetic material, it is preferably constructed of an iron nickel alloy and is more preferably constructed of $Ni_{80}Fe_{20}$. The pole could also be formed of a higher magnetic moment (high Bsat) material such as $Ni_{45}Fe_{55}$. While use of such a high Bsat material could provide improved magnetic properties the use of such a high Bsat material poses manufacturing challenges due to its corrosive nature.

Figure 5:
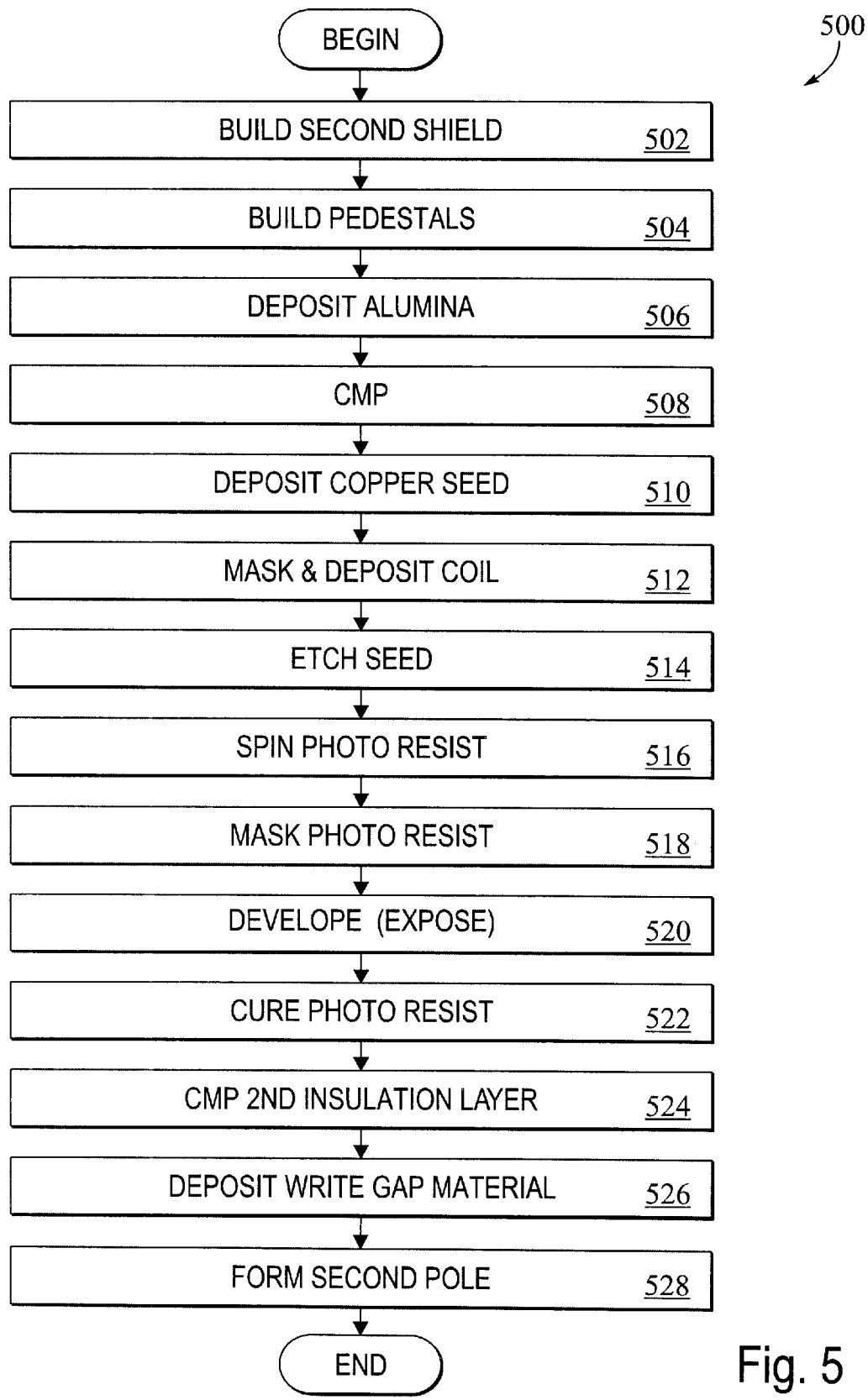
FIG. 5 is a process diagram of a method for forming a write element of the present invention.

With reference to FIG. 5, a method and process 500 for manufacturing the write head of the present invention will now be described. With the lower read head having been created according as discussed in the background of the invention, the process 500 begins with the step 502 of providing the second shield 414. The shield can be formed by plating a magnetic material such as $Ni_{80}Fe_{20}$ onto the first dielectric layer 410 of the read element 404 of the head 400. The second shield 414 is planarized by chemical mechanical polishing, thereby producing the planar upper surface 416. The process continues with the step 504 of building the pedestals 434 and 436. The pedestals 434 and 436 are preferably constructed of $Ni_{80}Fe_{20}$ and are formed by a plating process.

Figure 6:
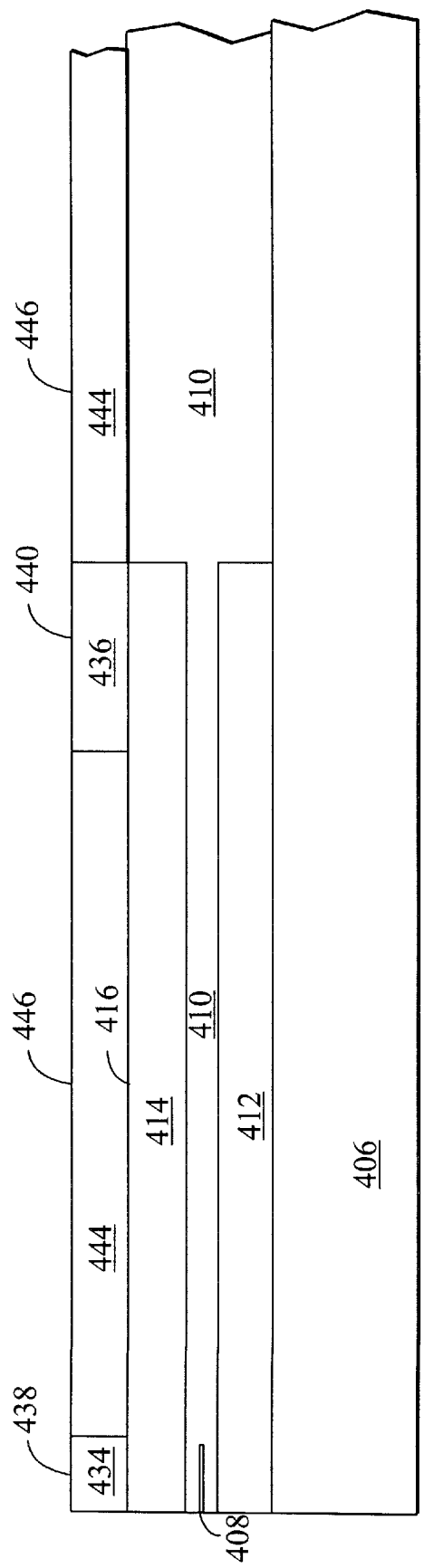
FIG. 6 is a cross sectional view, similar to FIG. 4, of the head of the present invention in an intermediate stage of construction.

In a step 506, the second dielectric layer 444 is deposited. The dielectric layer 444 is preferably constructed of alumina $Al_2O_3$. In a step 508 the dielectric layer 444 is planarized by a chemical mechanical polishing (CMP) process. The CMP is conducted sufficiently to expose and planarize the upper surfaces 438 and 440 of the pedestals 434 and 436 as well as planarizing the upper surface 446 of the dielectric layer 444. The structure formed thus far can be more clearly understood with reference to FIG. 6.

Figure 7:
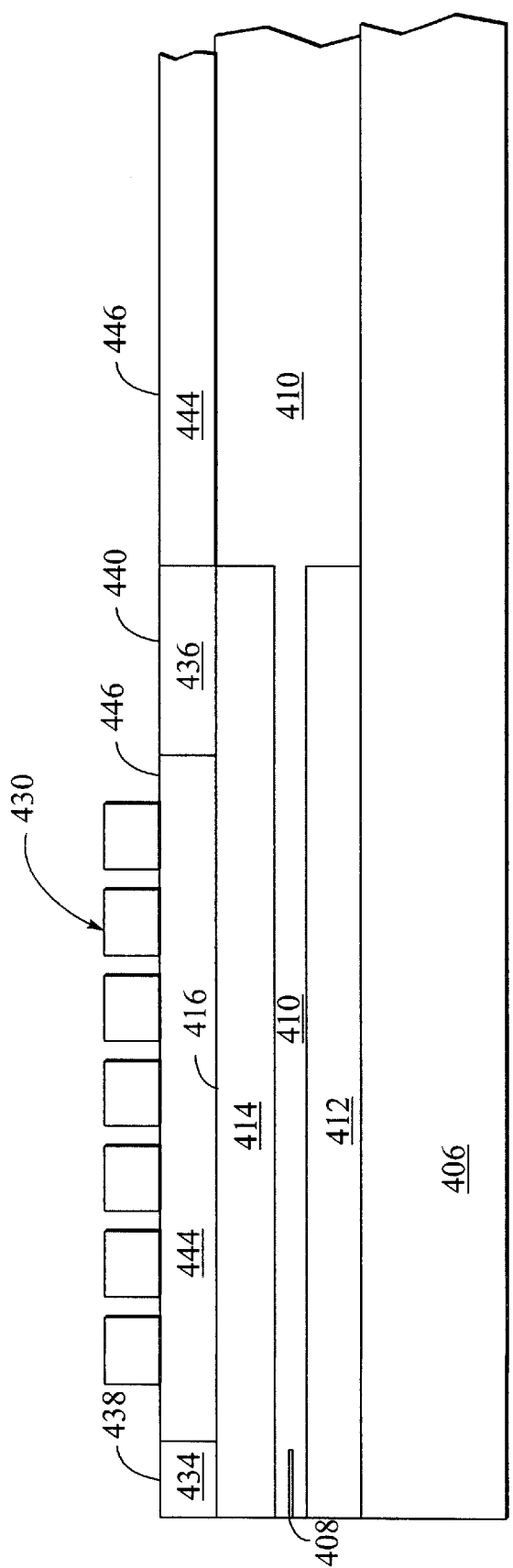
FIG. 7 is a cross sectional view, similar to FIG. 4, of the head of the present invention in an intermediate stage of construction.

Then, in a step 510 a copper seed layer is deposited over the structure formed thus far. The copper seed layer provides a conductive base upon which to plate the coil 430. With the copper seed deposited, the coil 430 is formed in a step 512. The coil is formed by first masking a pattern of the desired coil and then plating the coil. Subsequently, in a step 514, the copper seed is removed by etching. The structure formed thus far can be more readily understood with reference to FIG. 7.

Figure 8:
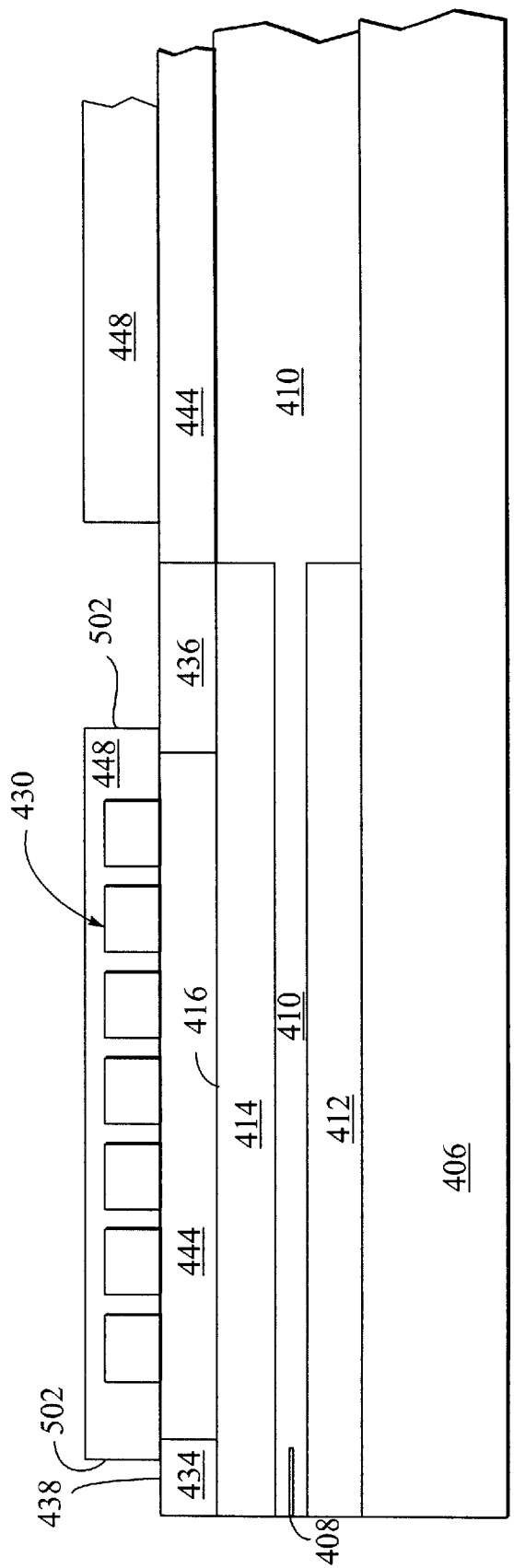
FIG. 8 is a cross sectional view, similar to FIG. 4, of the head of the present invention in an intermediate stage of construction.

Thereafter, in a step 516, a photoresist is spun onto the structure to provide the third insulation layer 448. In a step 518 the photoresist is masked to leave the pedestal uncovered and to provide the vias at the contacts of the coil 430. Then in a step 520, the photoresist is developed by exposure to selected frequencies of electromagnetic radiation. By lifting off the mask, the desired pattern will remain, however insulation layer 448 will have generally vertical abrupt edges 802 as will be better understood with reference to FIG. 8.

Figure 9:
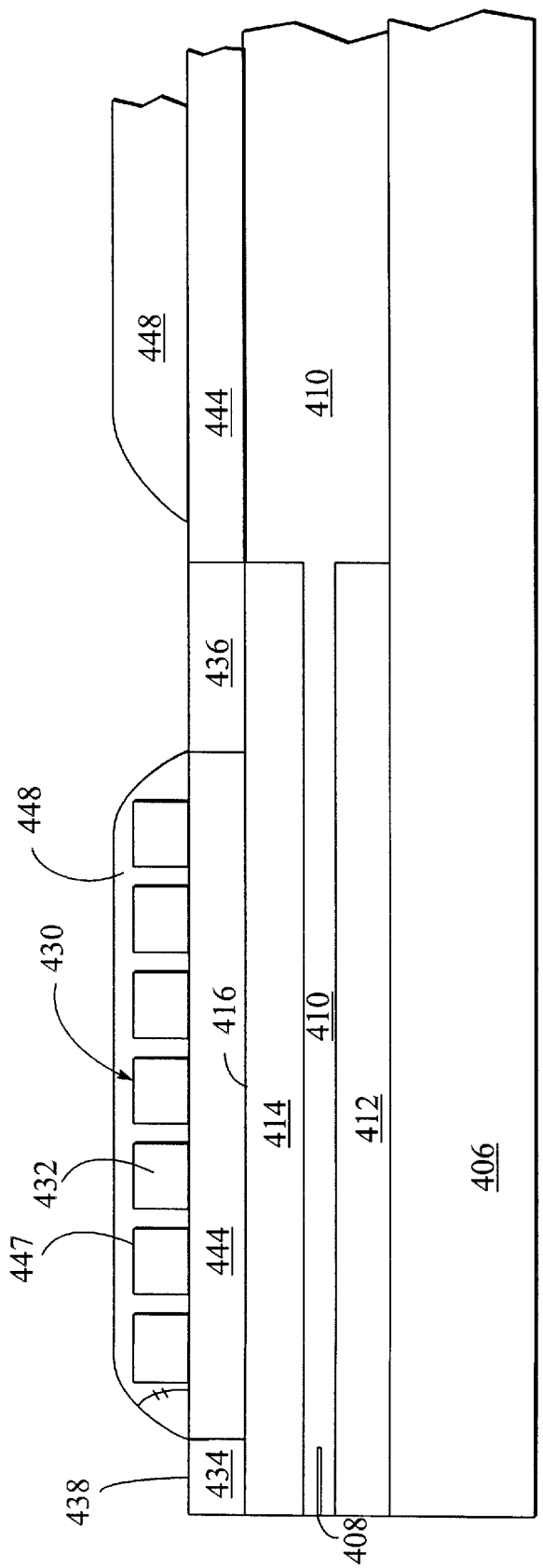
FIG. 9 is a cross sectional view, similar to FIG. 4, of the head of the present invention in an intermediate stage of construction.

In a step 522, the photoresist is cured. Curing the photoresist causes the edges to form a gradual sloping configuration defining the angle 452 in the write gap portion 426. This angle beneficially affects the magnetic performance of the write head 400 for reasons which will become apparent. This structure can be more readily understood with reference to FIG. 9.

Figure 10:
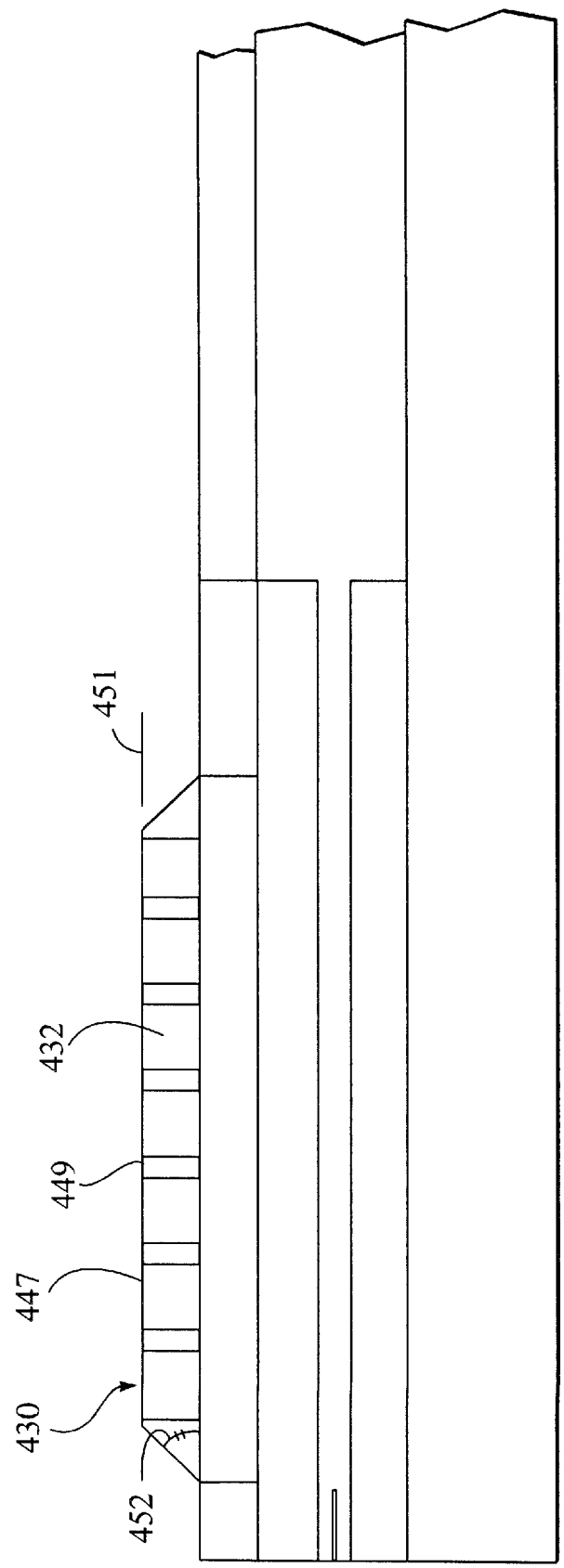
FIG. 10 is a cross sectional view, similar to FIG. 4, of the head of the present invention in an intermediate stage of construction.

In a step 524 the photoresist undergoes a CMP polishing process. The polishing exposes the top surfaces 447 of the winds 432 of the coil 447 and is conducted sufficiently to generate a smooth flush surface across the tops 447 of the winds and the top 449 of the third insulation layer 448, thereby defining the plane 451. This structure can be more readily understood with reference to FIG. 10.

Figure 11:
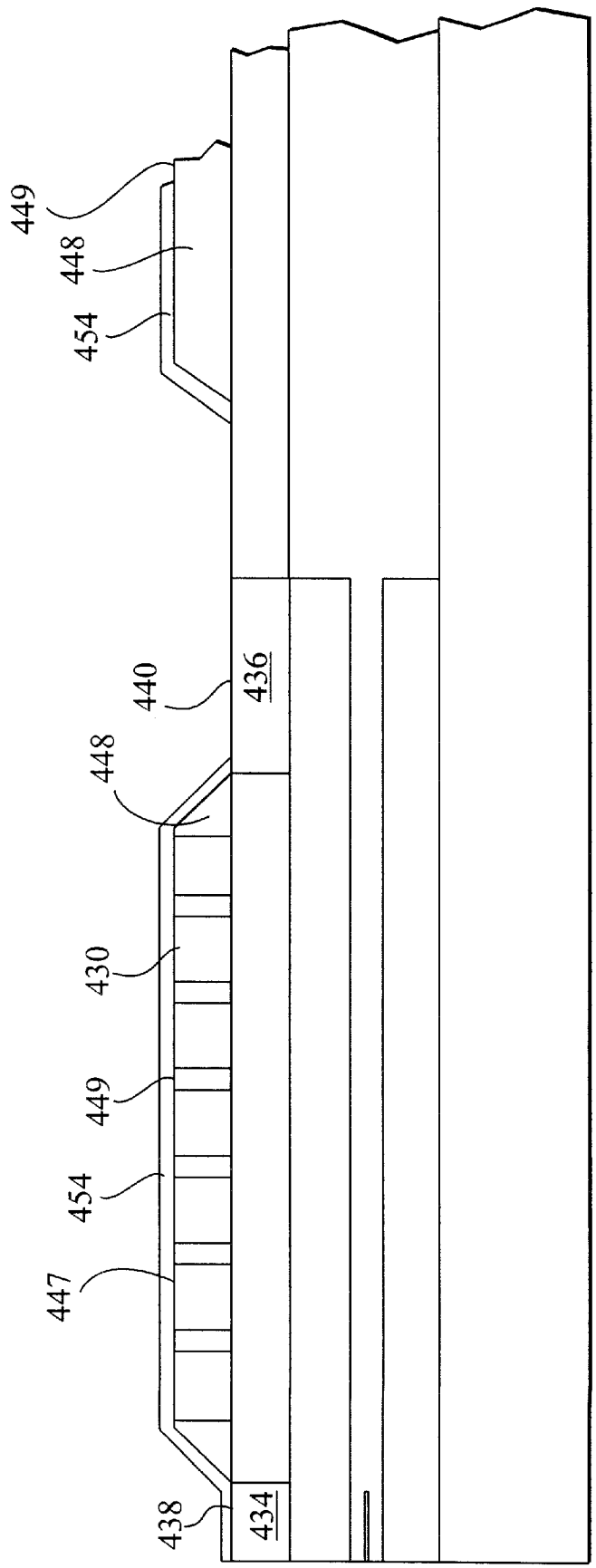
FIG. 11 is a cross sectional view, similar to FIG. 4, of the head of the present invention in an intermediate stage of construction.

Then, in a step 526, a layer of write gap material is deposited over the third insulation layer, and the coil 430. The write gap material layer is formed to cover the upper surface 438 of the write gap pedestal, and is masked and etched to expose the upper surface 440 of the back gap 436 and to provide vias at the locations of the contacts of coils 430. The structure formed thus far can be understood more readily with reference to FIG. 11.

Finally, in a step 528 the second pole 428 is provided. The second pole is preferably constructed of $Ni_{80}Fe_{20}$ and is formed by a plating process. The second pole 428 will take on the shape of the third insulation layer 448 and write gap material 454 in the write gap location 426 so that it will have an apex angle equal to angle 452. The write gap material layer 454 electrically insulates the second pole 428 from the coil 430. By planarizing the third insulation layer in step 524, the stack height of the head is reduced by 3 to 4 microns, resulting in a corresponding reduction in the topography of the second pole 428. This reduction in topography allows the second pole to be formed with a much smaller track width having tighter tolerances. In this way, the head 400 of the present invention can record with a data density of 40 $Gb/in^2$.

In summary, the present invention provides a magnetic head 400 having very high density write capabilities, due to its low stack height. The present invention uses the write gap material to insulate the coil from the second pole, thereby minimizing the insulation from the area above the coil. By reducing the stack height, the second pole can be formed to define an extremely small track width and can be built to much tighter tolerances. The invention has been described herein in terms of several preferred embodiments. Other embodiments of the invention, including alternatives, modification, permutations and equivalents of the embodiments described herein, will be apparent to those skilled in the art from consideration of the specification, study of the drawings, and practice of the invention. Therefore, the embodiments and preferred features described above should be considered exemplary, with the invention being defined by the appended claims which include all such alternatives, modifications, permutations and equivalents as fall within the true spirit and scope of the invention.

What is claimed is:

1. A thin film magnetic write head for high density data recording, the thin film magnetic head comprising:
    a magnetic yoke having a closed back gap portion and an open write gap portion and having first and second poles extending from said back gap portion to said write gap portion, said poles being separated to define a yoke interior there between;
    a first insulation layer formed over said first pole between said back gap portion and said write gap portion;
    a coil having a plurality of winds, at least a portion of said winds being formed over said first insulation layer within said interior of said yoke, each of said winds having an upper surface;
    a second insulation layer formed over said first insulation layer and having an upper surface which is flush with at least one upper surface of at least one of said winds; and
    a layer of non-magnetic, electrically insulating write gap material disposed between said coil and said second pole and contacting said upper surface of said second insulation layer, within said interior of said yoke, and extending into said write gap portion of said yoke.

2. A magnetic write head as recited in claim 1 wherein said second insulation layer has a flush planar upper surface substantially coplanar with each of said upper surfaces of said winds.

3. A magnetic write head as recited in claim 1 wherein said second insulation layer terminates adjacent said write gap portion in a taper defining an apex angle, said apex angle being less than 45 degrees.

4. A magnetic write head as recited in claim 1 wherein said write gap material is constructed of $Al_2O_3$.

5. A magnetic write head as recited in claim 1 wherein said write gap material has a thickness between 0.1 and 0.3 microns.

6. A magnetic write head as recited in claim 1 wherein said write gap material has a thickness no greater than 0.5 micron.

7. A magnetic write head as recited in claim 1 wherein said first insulation layer is constructed of $Al_2O_3$.

8. A magnetic write head as recited in claim 7 wherein said second insulation layer is constructed of photoresist.

9. A magnetic write head as recited in claim 8 wherein said coil is constructed of copper.

10. A magnetic write head as recited in claim 1 further comprising a read element.

11. A magnetic write head as recited in claim 10 wherein said read element includes:
    a first and second shield disposed adjacent one another and defining a space there between;
    a dielectric material sandwiched between said first and second shields; and
    a magnetic read sensor, embedded within said dielectric layer sandwiched between said first and second shields.

12. A magnetic write head as recited in claim 11 wherein at least a portion of said first pole serves as one of said shields.

13. A magnetic data storage system for storing data on a magnetic disk for use with a digital computer, said system comprising:
    an enclosure having an interior;
    a spindle contained within said interior of said enclosure and configured to support the magnetic disk for rotation thereon;
    a motor for rotating said disk;
    an arm pivotally connected with said enclosure;
    a magnetic head suspended from said arm distal from said pivotal connection and disposed proximal to said magnetic disk, said magnetic head comprising:
        a magnetically conducting first pole having an upper surface and first and second ends;
        first and second pedestals formed on said upper surface of said first pole at said first and second ends respectively, said first and second pedestals each having a planar upper surface;
        a first layer of insulating material formed over said upper surface of said first pole between said first and second pedestals and having an planar upper surface which is coplanar with said upper surfaces of said first and second pedestals;
        an electrically conducting coil having a portion thereof formed on said upper surface of said first insulation layer above said first pole, said coil having a planar upper surface;
        a second insulation layer formed over said first insulation layer, said second insulation layer having a planar upper surface which is coplanar with said upper surface of said coil;
        a layer of electrically insulating, non-magnetic write gap material formed over said coil and second insulation layer and extending over said second pedestal; and
        a second magnetically conducting pole formed over said write gap material and contacting said upper surface of said first pedestal.

14. A magnetic data storage system as recited in claim 13, said head further comprising a read element.

15. A magnetic data storage system as recited in claim 14, said read element comprising:
    a pair of shields disposed adjacent one another and defining a space there between;
    a dielectric material sandwiched between said first and second shields; and
    a magnetic sensor embedded within said dielectric material.

16. A magnetic data storage system as recited in claim 13 wherein said second insulation layer is planarized by a chemical mechanical polishing process to provide said planar upper surface.

17. A magnetic data storage system as recited in claim 13 wherein said write gap material has a thickness of between 0.1 and 0.3 microns.

18. A magnetic data storage system as recited in claim 13 wherein said write gap material is no greater than 0.5 microns thick.

* * * * *